US010218453B2

(12) United States Patent
Jain et al.

(10) Patent No.: US 10,218,453 B2
(45) Date of Patent: Feb. 26, 2019

(54) METHODS AND APPARATUS FOR LOGICAL ASSOCIATIONS BETWEEN ROUTERS AND OPTICAL NODES WITHIN A WAVELENGTH DIVISION MULTIPLEXING (WDM) SYSTEM

(71) Applicant: Juniper Networks, Inc., Sunnyvale, CA (US)

(72) Inventors: Puneet Jain, San Jose, CA (US); Amit Shukla, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 143 days.

(21) Appl. No.: 15/140,130

(22) Filed: Apr. 27, 2016

(65) Prior Publication Data
US 2017/0317777 A1 Nov. 2, 2017

(51) Int. Cl.
*H04J 14/00* (2006.01)
*H04J 14/02* (2006.01)
*H04Q 11/00* (2006.01)

(52) U.S. Cl.
CPC ........ *H04J 14/021* (2013.01); *H04J 14/0256* (2013.01); *H04J 14/0267* (2013.01);
(Continued)

(58) Field of Classification Search
CPC ...... H04J 14/021; H04J 14/02; H04J 14/0256; H04J 14/0267; H04J 14/0227;
(Continued)

(56) References Cited

U.S. PATENT DOCUMENTS 8,223,773 B2 * 7/2012 Doo .................. H04Q 11/0067
370/395.5
8,406,622 B2 * 3/2013 Doverspike ........ H04Q 11/0062
398/34
(Continued)

FOREIGN PATENT DOCUMENTS

CN 101820352 A 9/2010
CN 102427567 A 4/2012

OTHER PUBLICATIONS

Piotr Myslinski, et al. "Optical Transport Use Cases (Open Networking Foundation)", ITU-T Draft; Study Period 2013-2016, International Telecommunication Union, Geneva, CH, Dec. 5, 2013, pp. 1-41.
(Continued)

*Primary Examiner* — Hibret A Woldekidan
(74) *Attorney, Agent, or Firm* — Cooley LLP

(57) ABSTRACT

An apparatus includes a memory and a processor operatively coupled to the memory. The processor is configured to partition a set of ports of an optical multiplexer into a set of port groups including a first port group having a first set of ports and a second port group having a second set of ports mutually exclusive from the first set of ports. The processor is configured to associate the first port group with a first router and associate the second port group with a second router. When the optical multiplexer is operatively coupled to the first router and the second router, the first router is operatively coupled to the optical multiplexer via the first set of ports and not the second set of ports, and the second router is operatively coupled to the optical multiplexer via the second set of ports and not the first set of ports.

20 Claims, 4 Drawing Sheets

(52) U.S. Cl.
CPC ...... *H04Q 11/0005* (2013.01); *H04J 14/0227* (2013.01); *H04J 14/0275* (2013.01); *H04Q 2011/0016* (2013.01)

(58) Field of Classification Search
CPC .... H04J 14/0275; H04J 7/00; H04Q 11/0005; H04Q 2011/0016; H04Q 2011/0039; H04Q 2011/0079; H04Q 11/0001; H04Q 11/0062; H04Q 11/0071; H04Q 2011/0077; H04B 10/50; H04B 10/27
USPC ................ 398/49, 43, 48, 45, 83, 57, 68, 79
See application file for complete search history.

(56) References Cited

U.S. PATENT DOCUMENTS

| | | | |
|---|---|---|---|
| 8,923,277 | B1 | 12/2014 | Shekhar et al. |
| 9,225,597 | B2* | 12/2015 | Tubaltsev ............... H04L 45/02 |
| 9,313,129 | B2* | 4/2016 | Ganichev ............ H04L 41/0813 |
| 2002/0101635 | A1* | 8/2002 | Taketomi ........... H04B 10/0775 398/34 |
| 2002/0109879 | A1* | 8/2002 | Wing So .................... H04J 7/00 398/58 |
| 2002/0131120 | A1* | 9/2002 | Araki ...................... H04L 49/30 398/101 |
| 2002/0133734 | A1 | 9/2002 | Sarathy et al. |
| 2002/0184387 | A1* | 12/2002 | Yamaya .................. H04L 45/00 709/238 |
| 2004/0223762 | A1* | 11/2004 | Lee .................... H04Q 11/0005 398/51 |
| 2005/0196168 | A1* | 9/2005 | Amemiya .......... H04Q 11/0062 398/45 |
| 2005/0232629 | A1* | 10/2005 | Amemiya .......... H04Q 11/0005 398/45 |
| 2007/0212066 | A1* | 9/2007 | Winh .................. H04J 14/0297 398/45 |
| 2013/0045009 | A1* | 2/2013 | Beshai ............... H04Q 11/0005 398/49 |
| 2013/0326043 | A1* | 12/2013 | Liu ......................... H04L 41/12 709/223 |
| 2014/0212138 | A1* | 7/2014 | Sindhu ................... H04B 10/27 398/66 |
| 2014/0294009 | A1* | 10/2014 | Sahara ................ H04L 61/2553 370/392 |
| 2014/0321853 | A1* | 10/2014 | Beshai ............... H04Q 11/0005 398/52 |
| 2015/0055945 | A1 | 2/2015 | Wellbrock et al. |
| 2015/0117860 | A1* | 4/2015 | Braun ................. H04J 14/0282 398/58 |
| 2015/0312658 | A1* | 10/2015 | Winzer .............. H04Q 11/0005 398/45 |
| 2016/0112327 | A1* | 4/2016 | Morris .................. H04L 47/127 398/45 |
| 2016/0134510 | A1* | 5/2016 | Xuan ...................... H04L 41/12 370/254 |
| 2016/0261933 | A1* | 9/2016 | Jenkins ............... H04J 14/0212 |

OTHER PUBLICATIONS

Extended European Search Report and Search Opinion for European Application No. 16176694.4, dated Aug. 29, 2017, 11 pages.
First Office Action for Chinese Application No. 2016104872501, dated Jun. 4, 2018, 8 pages.

* cited by examiner

400

402
Receive a first request from a first router, the first request indicating a number of ports from a set of ports within an optical multiplexer, the optical multiplexer being operatively coupled to the first router.

404
Receive a second request from a second router, the second request indicating a number of ports from the set of ports within the optical multiplexer, the optical multiplexer being operatively coupled to the second router.

406
Assign a first set of ports from the set of ports to a first router identifier representing the first router based on the number of ports in the first request.

408
Assign a second set of ports from the set of ports to a second router identifier representing the second router based on the number of ports in the second request

412
Send a first signal to the first router to cause the first router to send a first set of optical signals to the optical multiplexer via the first set of ports.

414
Send a second signal to the second router to cause the second router to send a second set of optical signals to the optical multiplexer via the second set of ports.

FIG. 4

METHODS AND APPARATUS FOR LOGICAL ASSOCIATIONS BETWEEN ROUTERS AND OPTICAL NODES WITHIN A WAVELENGTH DIVISION MULTIPLEXING (WDM) SYSTEM

BACKGROUND

Some embodiments described herein relate generally to methods and apparatus for a wavelength division multiplexing (WDM) system. In particular, but not by way of limitation, some embodiments described herein relate to methods and apparatus for logically associating routers and optical nodes in a WDM system.

In current optical communication systems, management of routers and optical transceivers (also referred to herein as "optical nodes") are typically performed independently by different management systems. Each of the optical nodes is connected to multiple routers. Each of the routers forwards optical signals into multiple directions via multiple optical nodes. Therefore, a many-to-many relationship exists between the routers and the optical nodes. The routers, however, do not have the information as to how many optical nodes they are connected. Similarly, the optical nodes do not have the information as to how many routers they handle. The information of the associations between the routers and the optical nodes is desirable to the users of the routers so that the users can better control the interaction between the optical nodes and the routers.

Accordingly, a need exists for methods and apparatus to logically associate the ports of the routers with the optical nodes in an optical communication system.

SUMMARY

In some embodiments, an apparatus includes a memory and a processor operatively coupled to the memory. The processor is configured to be operatively coupled to an optical multiplexer having a set of ports. The processor is configured to partition the set of ports into a set of port groups including a first port group and a second port group. The first port group includes a first set of ports from the set of ports and the second port group includes a second set of ports from the set of ports. The second set of ports is mutually exclusive from the first set of ports. The processor is configured to associate the first port group with a first router and associate the second port group with a second router. When the optical multiplexer is operatively coupled to the first router and the second router, the first router is operatively coupled to the optical multiplexer via the first set of ports and not the second set of ports, and the second router is operatively coupled to the optical multiplexer via the second set of ports and not the first set of ports.

BRIEF DESCRIPTION OF THE DRAWINGS

FIG. 4 is a flow chart illustrating a method of logical associations between optical multiplexers and routers, according to an embodiment.

DETAILED DESCRIPTION

In some embodiments, an apparatus includes a memory and a processor operatively coupled to the memory. The processor is configured to be operatively coupled to an optical multiplexer having a set of ports. The processor is configured to partition the set of ports into a set of port groups including a first port group and a second port group. The first port group includes a first set of ports from the set of ports and the second port group includes a second set of ports from the set of ports. The second set of ports is mutually exclusive from the first set of ports. The processor is configured to associate the first port group with a first router and associate the second port group with a second router. When the optical multiplexer is operatively coupled to the first router and the second router, the first router is operatively coupled to the optical multiplexer via the first set of ports and not the second set of ports, and the second router is operatively coupled to the optical multiplexer via the second set of ports and not the first set of ports.

In some embodiments, a set of ports within an optical multiplexer can be virtualized and partitioned into a set of port groups. Based on a request received from a router, the optical multiplexer can associate a port group from the set of port groups with the router such that the router can communicate optical signals from/to the optical multiplexer via ports of the port group. An optical multiplexer can be associated with multiple routers and a router can be associated with multiple optical multiplexers. Such embodiments allow both the router and the optical multiplexer to have better control and management of data communications between the router and the optical multiplexer.

As used in this specification, the singular forms "a," "an" and "the" include plural referents unless the context clearly dictates otherwise. Thus, for example, the term "a port" is intended to mean a single port or multiple ports. The term "a port group" is intended to mean a single port group or multiple port groups.

Figure 1:
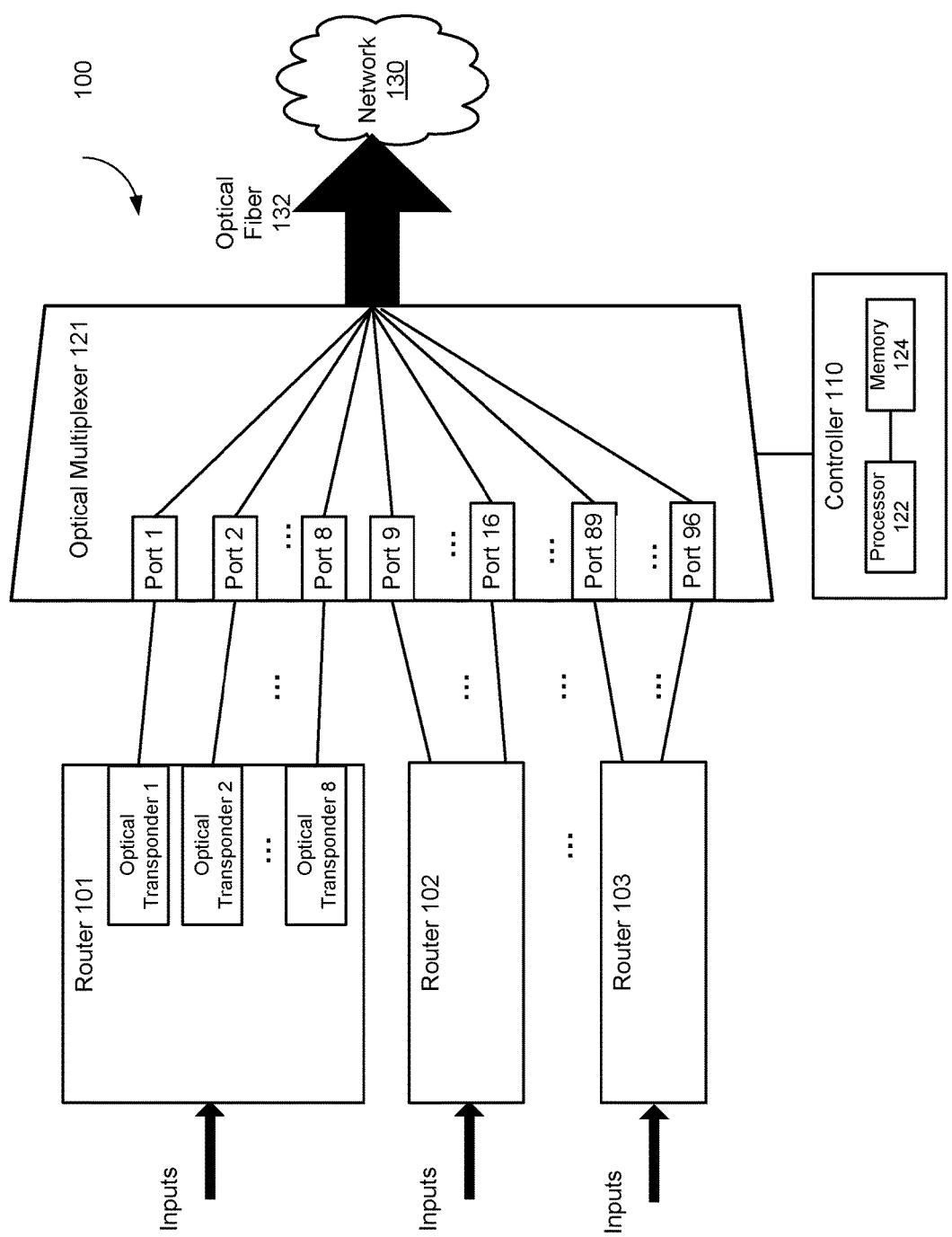
FIG. 1 is a schematic diagram illustrating a portion of an optical communication system, according to an embodiment.

FIG. 1 is a schematic diagram illustrating a portion of an optical communication network, according to an embodiment. The optical communication network 100 can be, for example, a fiber-optic network (e.g., a local area network (LAN), metropolitan area network (MAN), wide area network (WAN), or a long-haul network), or a converged network having functionalities of both a wireless network (e.g., a wireless local area network (WLAN)) and a wired network (e.g., an Ethernet). In some implementations, the optical communication network 100 can be a wavelength-division multiplexing (WDM) system or a dense wavelength-division multiplexing (DWDM) system.

The optical communication network 100 includes multiple routers (e.g., routers 101, 102, and 103), an optical multiplexer 121, a controller 110, an optical fiber 132 (or multiple optical fibers). Each of the routers (e.g., routers 101, 102, and 103) can be operatively coupled to the optical multiplexer 121 via the ports (e.g., port 1, port 2 . . . port 96) of the optical multiplexer 121. The controller 110 can be operatively coupled to the optical multiplexer 121. The optical multiplexer 121 can be operatively coupled to the network 130 via the optical fiber(s) 132.

The network 130 can be any network that is directly or operatively coupled to the optical communication network 100 through the optical fiber 132. For an example, the network 130 can be a fiber-optic network (e.g., a local area network (LAN), metropolitan area network (MAN), wide area network (WAN), or a long-haul network), or a converged network having functionalities of both a wireless network (e.g., a wireless local area network (WLAN)) and a wired network (e.g., an Ethernet). In some implementations, the optical communication network 100 can be a wavelength-division multiplexing (WDM) system or a dense wavelength-division multiplexing (DWDM) system.

In the optical communication network 100, a router (e.g., the routers 101, 102, and 103) can be any routing device configured to direct traffic (e.g., data packets, control packets) sent from and/or destined to devices within the optical communication network 100. In some implementations, the router (e.g., the routers 101, 102, and 103) can be an optical router. The routers (e.g., routers 101, 102, and 103) are configured to couple the remaining devices within the optical communication network 100 to one or more other networks (not shown in FIG. 1, e.g., positioned upstream of the routers 101, 102, 103). In the transmitter side of the optical communication network 100, the router can be positioned upstream of the optical multiplexer 121 of the optical communication network 100, and configured to connect the optical multiplexer 121 with another network or with the remaining devices within the optical communication network 100. In such embodiments, the router (e.g., the routers 101, 102, and 103) can be configured to send downstream traffic received from the other network (or remaining devices within the optical communication network 100) to the optical multiplexer 121. For example, as shown in FIG. 1, the routers 101, 102, and 103 can be operatively coupled to the optical multiplexer 121 and send downstream traffic to the optical multiplexer 121, which in turn sends the downstream traffic to the network 130. In the receiver side the optical communication network 100, the router can be operatively connected to an optical demultiplexer (not shown in FIG. 1) that receives traffic from the network 130, and forwards that traffic to the other network (or remaining devices within the optical communication network 100).

In some implementations, the router (e.g., the router 101) can include a set of optical transponders (e.g., optical transponder 1-optical transponder 8). Each optical transponder can be operatively coupled to the optical multiplexer 121 via a unique port from a set of ports (port 1-port 8) of the optical multiplexer 121. For example, as shown in FIG. 1, optical transponder 1 is operatively coupled to port 1 of optical multiplexer 121, optical transponder 2 is operatively coupled to port 2 of optical multiplexer 121, and so on. In the transmitter (or receiver) side of the optical communication network 100, the optical transponder can transmit (or receive) optical signals to the optical multiplexer 121 (from an optical demultiplexer (not shown in FIG. 1)). Each optical transponder can transmit or receive optical signals with a single wavelength. Each optical transponder (or a colored interface) can tune its wavelength to a desired wavelength used to transmit optical signals. For example, each optical transponder of optical transponder 1-optical transponder 8 of router 101 is associated with a wavelength that is unique to that router 101. In fact, the optical transponders of each router (e.g., 101, 102, 103, etc.) can be associated with a set of wavelengths that can be the same or different from the set of wavelengths associated with the optical transponders of the remaining routers connected to optical multiplexer 121. For example, the optical transponders 1-8 of router 101 can be associated with a set of wavelengths that is the same as the set of wavelengths for the optical transponders of router 102. In such an instance, an optical transponder from router 101 and an optical transponder from router 102 can be associated with the same wavelength.

The optical multiplexer 121 can be a hardware device that can, for example, receive, from each optical transponder in a router (e.g., router 101) via each coupled port from the set of ports, the optical signals each having a wavelength from a set of wavelengths. The optical multiplexer 121 can then combine (or aggregate) optical signals with different wavelengths and send to the network 130 through the optical fiber 132. The optical multiplexer 121 can be operatively coupled to multiple routers (e.g., routers 101, 102, 103) via the partial or full set of ports (e.g., port 1-port 96).

In some implementations, the optical multiplexer can be included in a reconfigurable optical add-drop multiplexer (ROADM) in a DWDM system. In such implementations, the ROADM can selectively drop (or remove) a wavelength from a multiplicity of wavelengths and thus from traffic on a particular channel associated with that wavelength. The ROADM can then add optical signals of the same wavelength (with different traffic) into the fiber (e.g., 132). The ROADM also allows for remote configuration and reconfiguration, and thus benefit the optical communication network 100 when implemented as a long-haul DWDM system. The set of ports (e.g., port 1-port 96) can be a set of Dense Wavelength Division Multiplexing (DWDM) ports.

The optical multiplexer 121 can be operatively coupled to a controller 110. In some implementations, the optical multiplexer 121 and the controller 110 can be separate modules physically co-located in the same chassis (or device). The controller 110 sends and/or receives control signals including control information to other components in the optical multiplexer 121. The controller 110 can include a processor 122, a memory 124, and a communication interface (not shown in FIG. 1).

The memory 124 can be, for example, a random-access memory (RAM) (e.g., a dynamic RAM, a static RAM), a flash memory, a removable memory, a database and/or so forth. In some implementations, the memory 124 can include or implement, for example, a database, process, application, and/or some other software modules (stored in memory 124 and/or executing in processor 122) or hardware modules configured to execute a logical association process between optical multiplexers and routers and/or one or more associated methods for the logical association process between optical multiplexers and routers of the optical multiplexer 121, as discussed in more detail below. In such implementations, instructions for executing the logical association process between optical multiplexers and routers, and/or the associated methods can be stored within the memory 124 and executed at the processor 122.

The processor 122 can include, for example, a field-programmable gate array (FPGA), an application specific integrated circuit (ASIC), a digital signal processor (DSP), and/or the like. The processor 122 can be configured to, for example, write data into and read data from the memory 124, and execute the instructions stored within the memory 124. In some implementations, based on the methods or processes stored within the memory 124, the processor 122 can be configured to execute the logical association process between optical multiplexers and routers, as described in FIG. 4.

Specifically, in some implementations, a router (or a controller in a router, not shown in FIG. 1), e.g., router 101, can send a request to the processor 122 of the controller 110, which is operatively coupled to the optical multiplexer 121. The request includes an identifier of the router (e.g., router 101), an identifier of the optical multiplexer 121 and a number of ports (e.g., 8) from a set of ports within the optical multiplexer 121. In one implementation, the request can be sent via an out-of-band communication (not shown) from the router 101 to the optical multiplexer 121.

The processor 122 can virtualize the set of ports into multiple groups and assign (or associate, partition) to the router 101 a group of ports with the number of ports requested by the router 101. In other words, when an optical transponder is activated in a router, the processor 122 associates one of the available ports of the optical multiplexer 121 to this optical transponder. For example, the optical multiplexer 121 has 96 ports (port 1-port 96). Router 101 sends a signal to the processor 122 requesting eight ports for transmitting eight channels of optical signals to the optical multiplexer 121. Based on the availability of each port of the set of ports within the optical multiplexer 121 and the requests from each router, the processor 122 can partition the 96 ports into twelve groups of ports, each group of the twelve groups of ports having eight ports. The processor 122 can assign the first group with port 1 to port 8 to the router 101. Alternatively, each group of the set of groups of ports can have different number of ports. For example, the processor 122 can partition the 96 ports into four groups of ports: the first group of ports having eight ports (port 1-port 8), the second group of ports having eight ports (port 9-port 16), the third group of ports having 72 ports (port 17-port 88), the fourth group of ports having eight ports (port 89-port 96). In some situations, for example, port 2 and port 3 from the first group have been assigned to a different router or are unavailable (e.g., currently being used by a different router), the processor can assign the second group of ports having the requested number of ports (e.g., port 9-port 16) to router 101. In some implementations, the processor 122 can randomly assign available ports of the optical multiplexer 121 to a router.

The partition of the set of ports into a set of groups of ports can be either static or dynamic. Similarly stated, in some situations, once the optical multiplexer 121 partitions the set of ports into a set of groups, for example, 96 ports being divided into 12 groups and each group having eight ports, this partition remains the same (static). In other situations, the partition of the set of ports into a set of groups of ports can change over time. For example, the processor 122 can partition the set of ports based on the traffic needs of a particular connection between the optical multiplexer 121 and a given router. For example, consider the situation where port 1 in group 1 of the optical multiplexer 121 was previously assigned to the optical transponder 1 of router 101, and the optical transponder 1 now needs a port that can transmit optical signals with higher bandwidth. The processor 122 can change the association between optical transponder 1 and port 1 from group 1 to an association between optical transponder 1 and, for example, port 8 from group 1 or a port from another group that can satisfy the optical transponder's higher bandwidth needs. For another example, consider the situation where router 101, at a first time, requests three ports of the optical multiplexer 121. The router 101 can, at a second time after the first time, as the traffic bandwidth needs increase, request five ports of the optical multiplexer 121. The processor 122 can accommodate such changes by re-partitioning the set of ports.

Once the processor 122 associates (or assigns) a group of ports with the router 101, the processor 122 can then send a signal to the router 101 indicating that a group of ports (e.g., group 1) with the requested number of ports (e.g., eight) of the optical multiplexer 121 has been allotted and assigned to router 101. The signal can include, for example, the identifier of the assigned group of ports, the identifiers of the assigned ports, and characteristics of the assigned ports (e.g., bandwidth, optical signal-to-noise ratio ("OSNR")). The router 101 (or a controller within the router 101) can send control information to the optical transponders (optical transponder 1-optical transponder 8), which can further cause the optical signals of a set of wavelengths to be sent from the optical transponders to the optical multiplexer 121 via each port from the assigned group of ports. The processor 122 can, for example, store the control information (i.e., partition information) to the memory 124, and can reference the partition information for future partitioning during a dynamic partitioning implementation.

In one implementation, only the router that is associated with a particular port group can manage or manipulate the particular port group. The router (e.g., router 101) can activate the wavelength services of port group 1 (e.g., port 1-port 8) and perform ongoing fault and performance monitoring for data communications between the router (e.g., router 101) and the optical multiplexer 121. In other words, the router (e.g., router 101) only has access and visibility to the ports (e.g., port 1-port 8) assigned to the router (e.g., router 101).

For downstream traffic (or west-east traffic in FIG. 1), once receiving the optical signals with a set of wavelengths from a single router or multiple routers operatively coupled to the optical multiplexer 121, the optical multiplexer 121 can wavelength-division multiplex the set of optical signals to produce a multiplexed optical signal. The optical multiplexer 121 can send the multiplexed optical signal to the network 130 via the optical fiber 132.

For upstream traffic (or east-west traffic in FIG. 1), an optical demultiplexer (not shown) can receive a multiplexed optical signal via an optical fiber(s) from another network (not shown) and divide the multiplexed optical signal into optical signals with a set of wavelengths. The optical demultiplexer (or a controller in the optical demultiplexer) can have partitioned its set of ports into a set of port groups in a process similar to the partition process described above with regards to an optical multiplexer. The optical demultiplexer can then send optical signals with the set of wavelengths to its destined router(s) via an assigned port(s) of a port group of the optical demultiplexer.

Figure 2:
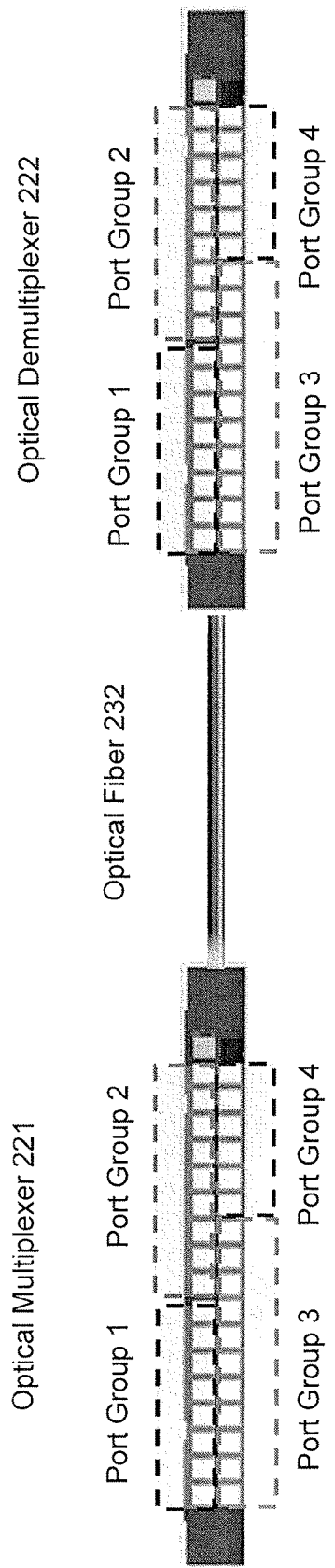
FIG. 2 is a diagram illustrating partition of ports within an optical multiplexer and an optical demultiplexer, according to an embodiment.

FIG. 2 is a diagram illustrating partition of ports of an optical multiplexer and an optical demultiplexer, according to an embodiment. The optical multiplexer 221 can transmit and/or receive optical signals from and/or to the optical demultiplexer 222 via an optical fiber(s) 232. In some embodiments, the optical multiplexer 221 is physically and functionally similar to the optical multiplexer 121 in FIG. 1. The optical multiplexer 221 and the optical demultiplexer 222 can be placed in two separate networks (similar to the optical communication network 100 in FIG. 1). In such implementations, the optical multiplexer 221 and the optical demultiplexer 222 can facilitate long-haul optical communications. For example, the optical multiplexer 221 can be placed in an optical communication network in San Francisco, and the optical demultiplexer 222 can be placed in an optical communication network in New York. The optical multiplexer 221 and the optical demultiplexer 222 communicate via the optical fiber 232 in between of San Francisco and New York.

Similar to the optical multiplexer 121 in FIG. 1, a controller (not shown in FIG. 2) of the optical multiplexer 221 in FIG. 2 can partition a set of ports into a set of groups of ports. For example, the optical multiplexer 221 can receive requests from routers (not shown in FIG. 1) operatively coupled to the optical multiplexer 221, indicating the number of ports requested by each router. The optical multiplexer 221 can then partition the ports, for example, into four groups of ports. Port group 1 includes eight ports (port 1-port 8); port group 2 includes nine ports (port 9-port 17); port group 3 includes eleven ports (port 18-port 28); port group 4 includes six ports (port 29-port 34). In one embodiment, this partition information (e.g., control information, or optical policy) can be sent from the optical multiplexer 221 to the optical demultiplexer 222 together with data signals via the data channels of the optical fiber. In another embodiment, the partition information (e.g., control information, or optical policy, or virtualization policy) can be sent from the optical multiplexer 221 to the optical demultiplexer 222 via a controller channel (or optical supervising channel ("OSC")) separate from the data channels.

Upon receiving the partition information, the optical demultiplexer 222, which is remote from optical multiplexer 221, can partition its set of ports based on the same partition mechanism. As with the above example, the optical demultiplexer 222 can partition the set of ports into four groups of ports: port group 1 includes eight ports (port 1-port 8); port group 2 includes nine ports (port 9-port 17); port group 3 includes eleven ports (port 18-port 28); port group 4 includes six ports (port 29-port 34). In another implementation, the optical demultiplexer 222 can partition its set of ports unrelated to the partition mechanism used by optical multiplexer 221.

Figure 3:
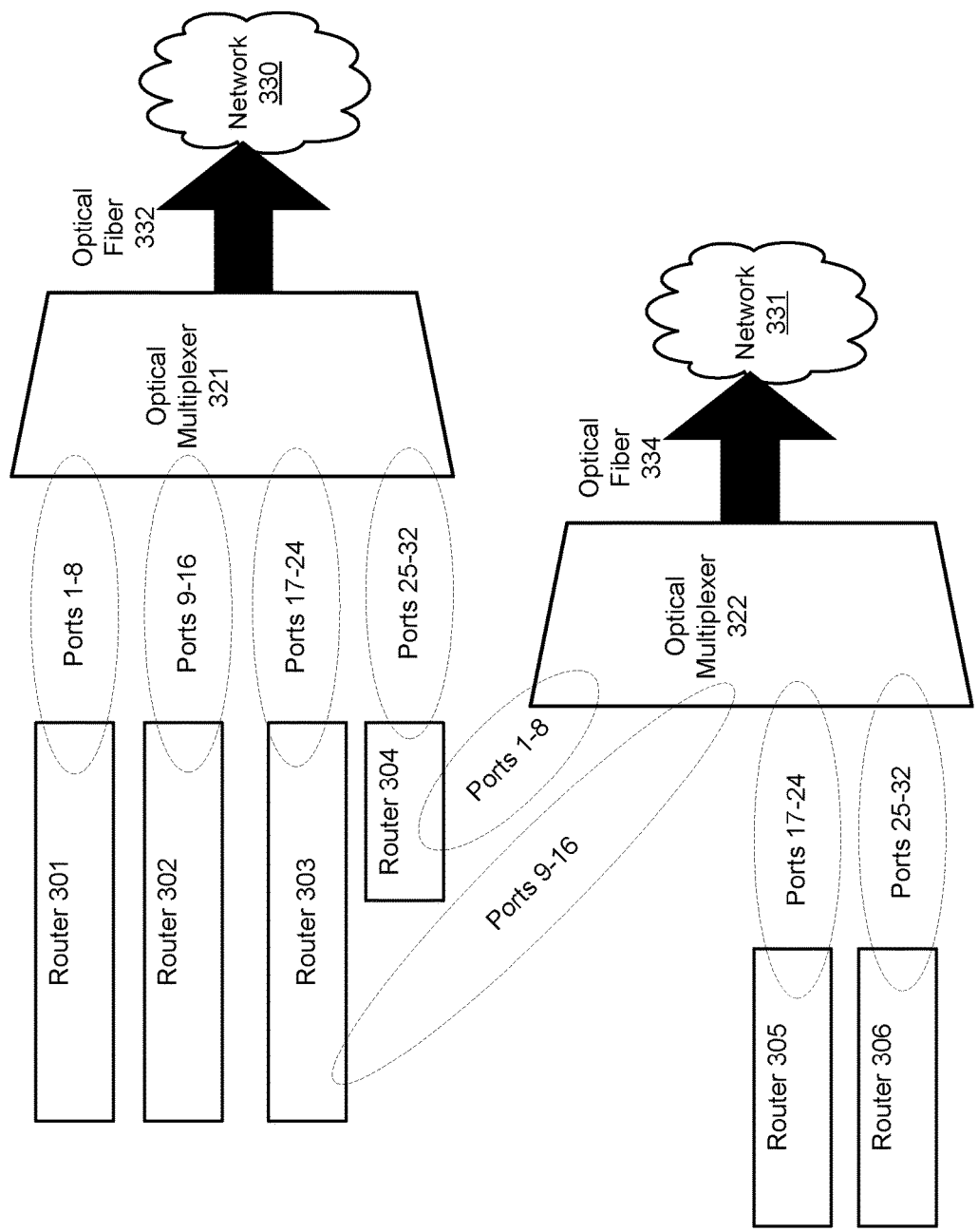
FIG. 3 is a schematic diagram illustrating logical associations between optical multiplexers and routers, according to an embodiment.

FIG. 3 is a schematic diagram illustrating logical associations between optical multiplexers and routers, according to an embodiment. In one embodiment, the optical multiplexers 321 and 322 and routers (routers 301-306) can have a many-to-many relationship. In other words, multiple routers (e.g., router 301-router 304) can be operatively coupled to one optical multiplexer 321, and multiple optical multiplexer, 321 and 322, can be operatively coupled to one router (e.g., router 303 and 304).

In FIG. 3, the optical multiplexer 321 and 322 can be physically and functionally similar to the optical multiplexer 121 in FIG. 1. Routers 301-306 can be physically and functionally similar to the router 101 in FIG. 1. The optical multiplexer 321 can be operatively coupled to a network 330 via an optical fiber 332. The optical multiplexer 322 can be operatively coupled to a network 331 via an optical fiber 334.

For example, based on requests from router 301, 302, 303, and 304, and the availabilities of the set of ports within the optical multiplexer 321, the optical multiplexer 321 can associate ports 1-8 to router 301, ports 9-16 to router 302, ports 17-24 to router 303, and ports 25-32 to router 304. The set of ports in each port group associated with each router can be mutually exclusive with the set of ports in another port group associated with another router. The optical multiplexer 321 can store such partition information in a memory (such as the memory 124 in FIG. 1) of the optical multiplexer 321. Similarly, based on the requests from router 303, 304, 305, and 306, and the availabilities of the set of ports within the optical multiplexer 322, the optical multiplexer 322 can associate ports 1-8 to router 304, ports 9-16 to router 303, ports 17-24 to router 305, and ports 25-32 to router 306. The optical multiplexer 322 can store such partition information in a memory (such as the memory 124 in FIG. 1) of the optical multiplexer 322. In one situation, the number of ports in the optical multiplexer 321 and the number of ports in the optical multiplexer 322 can be different. The partition mechanism (i.e., how the optical multiplexer partition its set of ports, how many groups are established, and how many ports in each group) by the optical multiplexer 321 can be different from that of the optical multiplexer 322. Although the discussion of FIG. 3 describes each multiplexer (demultiplexer) having its own controller to execute the partition mechanism at that multiplexer (demultiplexer), in alternative embodiments, a given single controller can control multiple multiplexers (demultiplexers).

On the other hand, in addition to the ports 17-24 from the optical multiplexer 321, the router 303 can be associated with ports 9-16 of the optical multiplexer 322. The router 303 can store its associations with ports in the multiple optical multiplexer 321 and 322, in a memory within the router 303. Similarly, the router 304 can be associated with ports 1-8 of the optical multiplexer 322 in addition to the association with ports 25-32 of the optical multiplexer 321. The optical multiplexer 322 can also associate with router 305 with ports 17-24 and router 306 with ports 25-32.

FIG. 4 is a flow chart illustrating a method of logical associations between optical multiplexers and routers, according to an embodiment. This method 400 can be implemented at a processor and/or a memory (e.g., processor 122 or memory 124 as discussed in FIG. 1) of a controller of an optical multiplexer. At 402, the optical multiplexer receives a first request from a first router (or a controller in the first router), e.g., router 101 in FIG. 1. The first request includes, for example, an identifier of the first router, an identifier of the optical multiplexer and a number of ports (e.g., 8) from a set of ports within the optical multiplexer. At 404, the optical multiplexer receives a second request from a second router (or a controller in the second router), e.g., router 102 in FIG. 1. The second request includes, for example, an identifier of the second router, the identifier of the optical multiplexer and a number of ports from the set of ports within the optical multiplexer. The first router and the second router are operatively coupled to the optical multiplexer.

At 406, the optical multiplexer virtualizes the set of ports into multiple groups and based on the first request and the availabilities of the ports within the set of ports, the optical multiplexer assigns (or associates, partitions) to the first router a first set of ports with the number of ports requested by the first router. At 408, the optical multiplexer, based on the second request and the availabilities of the ports, assigns to the second router a second set of ports with the number of ports requested by the second router. The second set of ports is mutually exclusive from the first set of ports. For example, the optical multiplexer partitions the 96 ports into twelve groups of ports, each group of the twelve groups of ports having eight ports. The optical multiplexer then assigns the first group with port 1 to port 8 to the first router, and port 9 to port 16 to the second router. Each group of the set of groups of ports can have different number of ports.

The partition of the set of ports into a set of groups of ports can be either static or dynamic. Similarly stated, in some situations, once the optical multiplexer partitions the set of ports into a set of groups, for example, 96 ports being divided into 12 groups and each group having eight ports, this partition remains the same (static). In other situations, the partition of the set of ports into a set of groups of ports can change over time. For example, the processor 122 can partition the set of ports based on the traffic needs of a particular connection between the router and the optical multiplexer.

Once the optical multiplexer associates (or assigns) a group of ports with the first router, the optical multiplexer then sends a first signal to the first router, at 412, indicating that a group of ports (e.g., group 1) with the requested number of ports (e.g., eight) of the optical multiplexer has been allotted and assigned. The signal includes, for example, the identifier of the assigned group of ports, the identifiers of the assigned ports, and characteristics of the assigned ports (e.g., bandwidth, optical signal-to-noise ratio ("OSNR")). The first router can send control information to the optical transponders (optical transponder 1-optical transponder 8) which can cause the optical signals of a set of wavelengths to be sent from the optical transponder to the optical multiplexer via each port from the assigned group of ports.

Similarly, at 414, the optical multiplexer sends a second signal to the second router to cause the second router to send a second set of optical signals to the optical multiplexer via the second set of ports. Once receiving the optical signals with a set of wavelengths from the first router and the second router, the optical multiplexer wavelength-division multiplexes the set of optical signals to produce a multiplexed optical signal. The optical multiplexer sends the multiplexed optical signal to a network via an optical fiber.

For upstream traffic (e.g., east-west traffic in FIG. 1), an optical demultiplexer can receive a multiplexed optical signal via an optical fiber(s) from another network and divide the multiplexed optical signal into optical signals with a set of wavelengths. The optical demultiplexer (or a controller in the optical demultiplexer) can partition its set of ports into a set of port groups in a process similar to the partition process described above with regards to an optical multiplexer. The optical demultiplexer can then send optical signals with the set of wavelengths to its destined router(s) via an assigned port(s) of a port group of the optical demultiplexer. Although the optical multiplexers and the optical demultiplexers are described separately with respect to downstream and upstream traffic, respectively, it should be understood that the traffic in the optical fiber(s) (e.g., optical fibers 332 and 334 in FIG. 3) can be bidirectional and thus, a given controller can control both an optical multiplexer and an optical demultiplexer, which can both be located within the same device.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or microinstructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

What is claimed is:

1. An apparatus, comprising:
a memory; and
a processor operatively coupled to the memory, the processor configured to be operatively coupled to an optical multiplexer, the optical multiplexer including a plurality of input ports,
the processor configured to partition the plurality of input ports into a plurality of input port groups including a first input port group and a second input port group, the first input port group including a first set of input ports from the plurality of input ports, the second input port group including a second set of input ports from the plurality of input ports mutually exclusive from the first set of input ports,
the processor configured to assign a first router identifier to the first input port group, the first router identifier associated with a first router,
the processor configured to assign a second router identifier to the second input port group, the second router identifier associated with a second router,
the processor configured to associate, based on the first router identifier, the first input port group with the first router and associate, based on the second router identifier, the second input port group with the second router causing (1) the first router to be operatively coupled to the optical multiplexer via the first set of input ports and not the second set of input ports, and (2) the second router to be operatively coupled to the optical multiplexer via the second set of input ports and not the first set of input ports, when the optical multiplexer is operatively coupled to the first router and the second router.

2. The apparatus of claim 1, wherein the first router includes a plurality of optical transponders, each optical transponder from the plurality of optical transponders is operatively coupled to the optical multiplexer via a unique input port from the first set of input ports.

3. The apparatus of claim 1, wherein:
the optical multiplexer is a first optical multiplexer,
the first router including a first set of optical transponders and a second set of optical transponders, each optical transponder from the first set of optical transponders is operatively coupled to the first optical multiplexer via a unique input port from the first set of input ports, each optical transponder from the second set of optical transponders is operatively coupled to a second optical multiplexer and not the first optical multiplexer.

4. The apparatus of claim 1, wherein information is transmitted via a fiber to a remote optical demultiplexer, the information including the association of the first input port group with the first router and the association of the second input port group with the second router.

5. The apparatus of claim 1, wherein the optical multiplexer is a Reconfigurable Optical Add-Drop Multiplexer (ROADM).

6. The apparatus of claim 1, wherein the plurality of input ports is a plurality of Dense Wavelength Division Multiplexing (DWDM) ports.

7. The apparatus of claim 1, wherein:
at a first time, the first set of ports has a number of input ports,
at a second time after the first time, the first set of input ports has a number of input ports different from the number of input ports of the first set of input ports at the first time,
traffic needs of the first router at the first time is different from traffic needs of the first router at the second time.

8. An apparatus, comprising:
a memory; and
a processor operatively coupled to the memory, the processor configured to be operatively coupled to an optical multiplexer, the optical multiplexer including a plurality of ports,
the processor is configured to receive, from a first router, a request including a number of ports of the first router to be operatively coupled to the optical multiplexer,
the processor configured to partition the plurality of ports into a plurality of port groups including a first port group and a second port group, the first port group including a first set of ports from the plurality of ports, the second port group including a second set of ports from the plurality of ports mutually exclusive from the first set of ports, the first set of ports having the number of ports of the first router,
the processor configured to associate the first port group with the first router and associate the second port group with a second router causing (1) the first router to be operatively coupled to the optical multiplexer via the first set of ports and not the second set of ports, and (2) the second router to be operatively coupled to the optical multiplexer via the second set of ports and not the first set of ports, when the optical multiplexer is operatively coupled to the first router and the second router.

9. An apparatus, comprising:
a memory, and
a processor operatively coupled to the memory, the processor configured to be operatively coupled to an optical multiplexer,
the processor configured to assign a first set of ports from a plurality of ports associated with the optical multiplexer to a first router identifier, the first router identifier representing a first router,
the processor configured to assign a second set of ports from the plurality of ports associated with the optical multiplexer to a second router identifier, the second router identifier representing a second router,
the processor configured to send, to the first router, identifiers associated with each port from the first set of ports causing the first router to be operatively coupled to the optical multiplexer via the first set of ports and not the second set of ports when the optical multiplexer is operatively coupled to the first router,
the processor configured to send, to the second router, identifiers associated with each port from the second set of ports causing the second router to be operatively coupled to the optical multiplexer via the second set of ports and not the first set of ports when the optical multiplexer is operatively coupled to the second router.

10. The apparatus of claim 9, wherein the processor is configured to receive, from the first router, a request including a number of ports of the first router to be operatively coupled to the optical multiplexer.

11. The apparatus of claim 9, wherein the first router includes a plurality of optical transponders, each optical transponder from the plurality of optical transponders is operatively coupled to the optical multiplexer via a unique port from the first set of ports.

12. The apparatus of claim 9, wherein:
the optical multiplexer is a first optical multiplexer,
the first router including a first set of optical transponders and a second set of optical transponders, each optical transponder from the first set of optical transponders is operatively coupled to the first optical multiplexer via a unique port from the first set of ports, each optical transponder from the second set of optical transponders is operatively coupled to a second optical multiplexer and not the first optical multiplexer.

13. The apparatus of claim 9, wherein the optical multiplexer is a Reconfigurable Optical Add-Drop Multiplexer (ROADM).

14. The apparatus of claim 9, wherein the plurality of ports is a plurality of Dense Wavelength Division Multiplexing (DWDM) ports.

15. A non-transitory processor-readable medium storing code representing instructions to be executed by a processor, the code comprising code to cause the processor to:
receive a first request from a first router, the first request indicating a number of ports from a plurality of ports within an optical multiplexer, the optical multiplexer being operatively coupled to the first router;
receive a second request from a second router, the second request indicating a number of ports from the plurality of ports within the optical multiplexer, the optical multiplexer being operatively coupled to the second router;
assign a first set of ports from the plurality of ports to a first router identifier representing the first router based on the number of ports in the first request;
assign a second set of ports from the plurality of ports to a second router identifier representing the second router based on the number of ports in the second request;
send a first signal to the first router to cause the first router to send a first plurality of optical signals to the optical multiplexer via the first set of ports; and
send a second signal to the second router to cause the second router to send a second plurality of optical signals to the optical multiplexer via the second set of ports.

16. The non-transitory processor-readable medium of claim 15, wherein:
the optical multiplexer is configured to wavelength-division multiplex the first plurality of optical signals and the second plurality of optical signals to produce a multiplexed optical signal,
the optical multiplexer is configured to send the multiplexed optical signal via an optical fiber.

17. The non-transitory processor-readable medium of claim 15, wherein:

the optical multiplexer is configured to send information via an optical fiber to a remote optical multiplexer, the information including the assignment of the first set of ports to the first router and the assignment of the second set of ports to the second router.

18. The non-transitory processor-readable medium of claim 15, wherein:
the optical multiplexer is configured to send information, via an optical fiber, to a remote optical multiplexer, the information including the assignment of the first set of ports to the first router and the assignment of the second set of ports to the second router, the remote optical multiplexer partitioning a plurality of ports associated with remote optical multiplexer based on the information.

19. The non-transitory processor-readable medium of claim 15, wherein the plurality of ports is a plurality of Dense Wavelength Division Multiplexing (DWDM) ports.

20. The non-transitory processor-readable medium of claim 15, wherein the first request is received via an out-of-band communication.

\* \* \* \* \*